April 21, 1936.  D. M. DOW  2,037,890
HOUSEHOLD APPLIANCE
Filed Aug. 7, 1933　　2 Sheets-Sheet 1
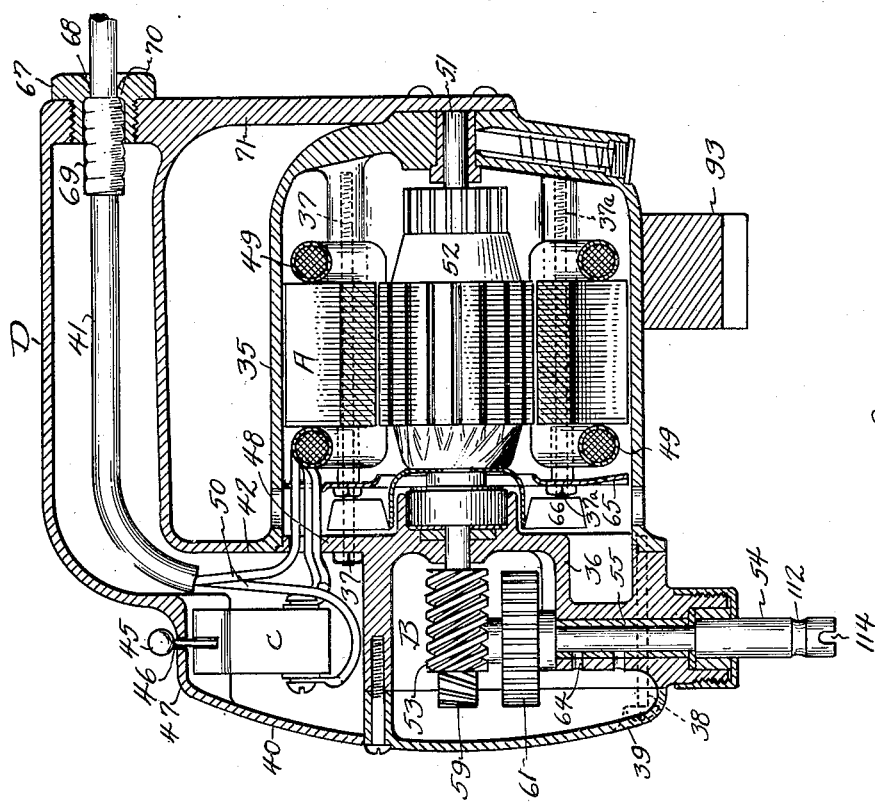
Inventor
Dewey M. Dow
By Lynn H. Latta Attorney April 21, 1936.  D. M. DOW  2,037,890
HOUSEHOLD APPLIANCE
Filed Aug. 7, 1933  2 Sheets-Sheet 2
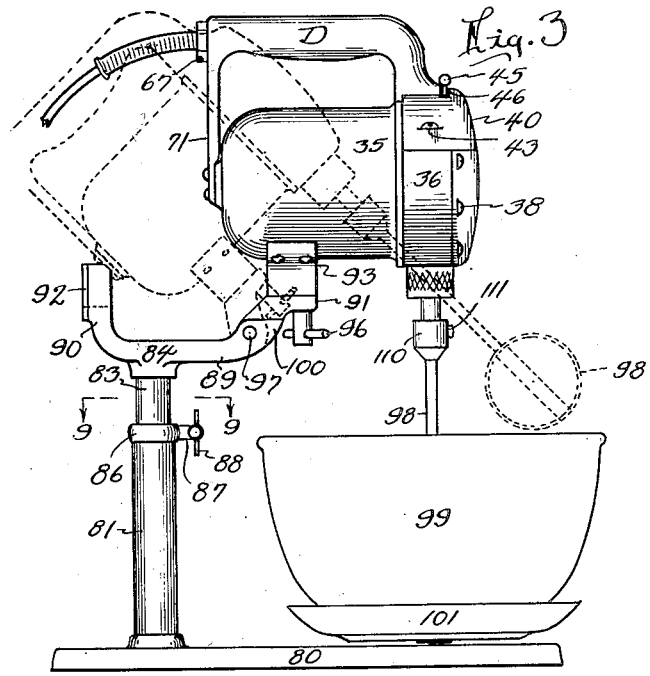
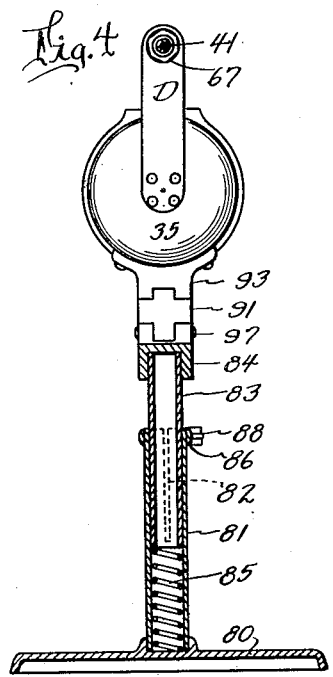
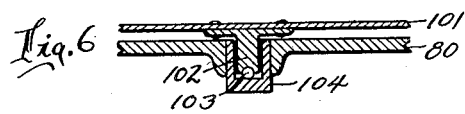
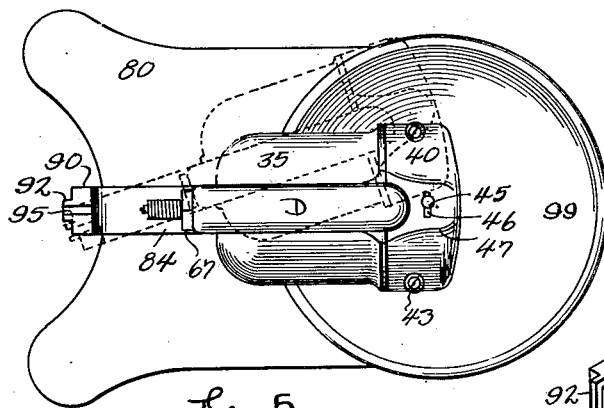
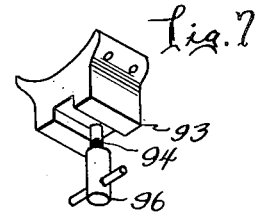
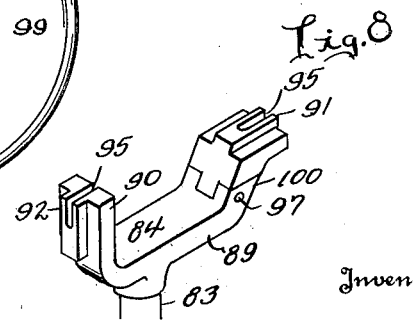
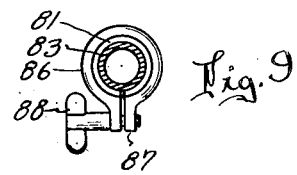
Inventor
Dewey M. Dow
Lynn H. Latta  Attorney Patented Apr. 21, 1936

2,037,890

UNITED STATES PATENT OFFICE 2,037,890

HOUSEHOLD APPLIANCE

Dewey M. Dow, Toledo, Ohio, assignor to Air-Way Electric Appliance Corporation, Toledo, Ohio, a corporation of Delaware Application August 7, 1933, Serial No. 683,993

8 Claims. (Cl. 172—36)

This invention relates to motor driven household appliances, and has for its general object to provide a novel power unit including gear reduction and built in switch; a stand on which the power unit may be supported in various positions and on which various attachments may be simultaneously supported in driven engagement with the power unit.

Other objects of the invention will appear in the following description, reference being had to the accompanying drawings, in which:

Fig. 1 is an axial sectional view of the power unit.

Fig. 2 is a transverse sectional view through the gear housing thereof.

Fig. 3 is a side elevation of the food mixed combination.

Fig. 4 is a rear elevation thereof, the pedestal being shown in section.

Fig. 5 is a plan view of the same.

Fig. 6 is a sectional view of the bowl support mounting.

Fig. 7 is a perspective view of the power unit attachment socket.

Fig. 8 is a perspective view of the pedestal bracket.

Fig. 9 is a sectional view of the pedestal, taken on the line 9—9 of Fig. 3.

I will now describe in detail the several features of my invention, taking up first, the power unit. External views of the power unit are shown in Figs. 3, 4, and 5. Detailed sectional views thereof are Figs. 1 and 2.

The power unit comprises generally an electric motor A, reduction gearing B, a handle D, and a switch C.

The motor dome 35 is closed at its open end by the gear case 36, which is held in place by two field studs 37 and six cap screws 38, which serve also to secure the gear case cover 39 to the case 36. When the cover 39 is removed, the gear case is held by the two studs 37, which extend thru the flange 48 of the case 36.

The case 36 and cover 39 are segmental in shape, the switch case 40 serving to complete the rounded contour of the power unit head. The case 36 has the flat side wall 36a.

The switch case 40 is formed integrally with the handle D, and communicates with the hollow interior thereof so that the motor cord 41 may extend through the handle and directly into the switch case, fully protected and concealed. The switch case is open at the rear to receive and join the rim of the motor dome 35, at 42. It is secured to the gear case 36 by cap screws 43.

The switch C is secured as at 44 in the switch case 40, and has an operating lever 45, extending through a slot 46 in the semi-cylindrical crown 47 of the switch case, shaped to register with the oscillating path of movement of the head of the lever 45, and to receive a portion of the switch C. It may be noted at this point that the axis of oscillation of the switch lever is parallel to the handle D, and the switch is located just forwardly of the forward extremity of the handle, whereby the lever may be operated by the thumb and forefinger of the operator while the handle is held in the other fingers of the same hand.

The gear case 36 has a flange 48 to complete the closure of the motor dome 35.

In the motor dome 35 are mounted the dual wound fields 49 of the motor A, connected through an opening in the flange 48 by means of conductors 50 to the switch C and conduit 41, the switch C being a double throw switch capable of cutting in one or both of the fields to achieve two speeds in the motor.

The extension of the switch case 40 within the periphery of the power unit head makes it possible to thus extend the conductors directly into the motor dome, fully enclosed all the way.

The shaft 51 of the armature 52 is journalled at one end in the motor dome 35 and at its other end in the gear case 36, extending therethrough to carry the worm 53 which forms part of the reduction gearing.

The power delivery shaft 54 is journalled in a bushing 55 in the gear case 36, on an axis which is radial to the power unit head and intersects the armature shaft axis at right angles. In order to connect the armature shaft to the delivery shaft 54, I provide a counter shaft 56, journalled in bearings 57 and 58 in the gear case, on an axis parallel to but offset from the axis of the delivery shaft in a direction at right angles to the armature shaft. The counter shaft 56 carries a worm wheel 59 meshing with the worm 53, and a pinion 60 meshing with a gear 61 on the delivery shaft 54. The two latter gears serve to further reduce the speed of rotation after considerable reduction thru the gears 53, 59, and also to bring the line of drive back to the center of the power unit head.

A thrust bearing 62 carries the thrust set up in the shaft 56 by the reaction of the inclined teeth of the worm wheel 59. An adjustable end bearing 63, threadably mounted in the gear case wall 36a, is utilized to secure a snug adjustment in the end play allowed in the counter shaft.

The bushing 55 is drilled at 64 to allow lubricant to reach the delivery shaft 54 from within the gear case 36, which is closed fluid tight by the cover 39 so that it may be packed with lubricant.

A ring shaped fan plate 65 is mounted on the studs 37 and 37a (the latter terminating short of the gear case 36). A ventilating fan 66 is mounted on the armature 52 and travels in the space between the plate 65 and the gear case 36.

The conduit 41 leaves the handle D through a bushing 67 which has a belled mouth 68 to protect the conduit from breaking under bending strains. The conduit is secured against pulling out of the handle by a short length of wrapped tape 69 which engages in the bushing 67 against a shoulder 70 formed therein. An arm 71 on the handle D, is secured to the rear of the motor dome 35.

The power unit, when used for kitchen utensils is supported on the pedestal.

The pedestal comprises a base 80 to which is affixed a hollow post 81, split at its upper end as at 82 (Fig. 4), and receiving a shaft 83 carrying the bracket 84. A spring 85 in the post 81 normally supports the bracket 84 plus its load, in a raised position below which the bracket may be depressed by manual pressure and secured by the constricting band 86 secured to the upper end of the post 81. The band 86 terminates in spaced ears 87 embracing the slot 82, and is tightened by a thumb screw 88 connecting the ears 87.

The bracket 84 has a horizontal arm 89 and a vertical arm 90 carrying coupler claw members 91 and 92 respectively, also positioned horizontally and vertically respectively.

A coupler socket member 93 is secured to the motor dome 35. It is formed, (Fig. 7) to receive either claw 91 or 92, and has a stud 94 receivable in a slot 95 in either claw member, and a thumb nut 96 to secure it in place.

The claw 91 is hinged at 97 to the arm 89, so that when the power unit is attached thereto as shown in Fig. 3, it may be hinged backwardly until the end of the motor dome rests on the end of the claw 92, as shown in dotted lines. The power unit is so positioned over the hinge 97 that when in such back-tilted position, its weight will be concentrated on the inner side of the hinge so that it will remain by gravity in the back-tilted position and will hold an attached beater element 98 in position above a mixing bowl 99, whereas when moved forwardly to the full line position shown, its weight will be concentrated on the outer side of the hinge, and it will remain in that position by gravity. It is supported in the horizontal position shown by a finger 100 on the arm 89, engaging beneath the claw 91.

The bowl 99 is supported on a turn table 101.

I claim as my invention:

1. In a portable power unit a motor dome comprising a cup shaped housing open at one end, a sector shaped gear housing and a separate sector shaped switch casing together cooperating to form a complete end closure for said motor dome, an electric motor in said dome, gearing in said housing geared to the shaft of said motor, and a switch in said casing.

2. In a portable power unit a motor dome comprising a cup shaped housing open at one end, a switch casing covering at least a sector of the open end of said dome, a motor in the dome, a switch in the casing connected to the motor through said open end, and a handle formed integrally with said casing and extending in spaced relationship to the side of the dome.

3. In a portable power unit, a motor dome comprising a cup shaped housing open at one end, a sector shaped gear housing and a separate sector shaped switch casing together cooperating to form a complete end cover for said motor dome, said gear housing having a partition wall separating it from the switch casing, an electric motor in the motor dome, gearing in said gear housing geared to the shaft and to said motor, said gearing including a counter shaft one end of which is journaled in a bearing attached to the peripheral region of the gear housing and the other end of which is journalled in a bearing attached to the partition wall, an adjustable end bearing for said counter shaft, extending through said partition wall and accessible from within the confines of said switch casing, and a switch in said casing.

4. In a portable power unit, a motor dome comprising a cup shaped housing open at one end, a sector shaped gear housing and a separate sector shaped casing together cooperating to form a complete end cover for said motor dome, said gear housing having a partition wall separating it from the casing, an electric motor in the motor dome, gearing in said gear housing geared to the shaft and to said motor, said gearing including a counter shaft one end of which is journalled in a bearing attached to the peripheral region of the gear housing and the other end of which is journalled in a bearing attached to the partition wall, an adjustable end bearing for said counter shaft, extending through said partition wall and accessible from within the confines of said casing.

5. In a portable power unit, a motor dome comprising a cup shaped housing open at one end, an end plate closing the open end of said motor dome, a sector shaped gear housing integrally formed on one side of said end plate, and open at its side opposite said end plate, a sector shaped cover plate detachably secured to said housing over its open side, and a sector shaped switch casing cooperating with said gear housing and cover plate to form a complete end cover for said motor dome, an electric motor in said dome, gearing in said gear housing geared to said motor, and a switch in said switch casing.

6. In a portable power unit, a motor dome, comprising a cup shaped housing open at one end, a sector shaped gear housing and a separate sector shaped switch casing together cooperating to form a complete end closure for said motor dome, an electric motor in said dome, gearing in said gear housing geared to the shaft of said motor, a switch in said casing, and wiring extending from said switch to said motor between said gear housing and the rim of the motor dome.

7. In a portable power unit, a motor dome comprising a cup shaped housing open at one end, a switch casing covering at least a sector of the open end of said dome, a motor in the dome, a switch in the casing connected to the motor through said open end, a handle formed integrally with said casing and extending in spaced relationship to the side of the dome, and a current supply cord entering said handle at its end remote from the switch and extending through the handle to said switch.

8. In a portable power unit, a motor dome comprising a cup shaped housing open at one end, a switch casing covering at least a sector of said open end, a motor in the dome, a switch in the casing, a hollow handle formed integrally with said casing, the passage within the handle merging into a space separating the switch from said open end of the motor dome, current supply wires extending through the handle and into said space, one of said wires being attached to the switch and the other of said wires extending through the open end of the motor dome to said motor, and a third wire extending from the switch through said open end to the motor.

DEWEY M. DOW.